(12) United States Patent
Kopiness et al.

(10) Patent No.: US 12,446,118 B2
(45) Date of Patent: Oct. 14, 2025

(54) INDUCTION WARMER STATION (71) Applicant: The Vollrath Company, L.L.C., Sheboygan, WI (US)

(72) Inventors: Jeremiah Kopiness, Saukville, WI (US); Andrew Amrhein, Sheboygan, WI (US)

(73) Assignee: The Vollrath Company, L.L.C., Sheboygan, WI (US)

( * ) Notice: Subject to any disclaimer, the term of this patent is extended or adjusted under 35 U.S.C. 154(b) by 939 days.

(21) Appl. No.: 17/581,715

(22) Filed: Jan. 21, 2022

(65) Prior Publication Data
US 2023/0239973 A1    Jul. 27, 2023

(51) Int. Cl.
| | |
|---|---|
| H05B 6/10 | (2006.01) |
| A47J 36/24 | (2006.01) |
| A47J 36/32 | (2006.01) |
| H05B 6/06 | (2006.01) |
| H05B 6/12 | (2006.01) |

(52) U.S. Cl.
CPC ............ *H05B 6/10* (2013.01); *A47J 36/2483* (2013.01); *A47J 36/32* (2013.01); *H05B 6/062* (2013.01); *H05B 6/1209* (2013.01); *H05B 2206/023* (2013.01); *H05B 2213/05* (2013.01)

(58) Field of Classification Search
CPC ........ H05B 6/10; H05B 6/062; H05B 6/1209; H05B 2206/023; H05B 2213/05; A47J 36/2483; A47J 36/32
See application file for complete search history.

(56) References Cited

U.S. PATENT DOCUMENTS

| | | | |
|---|---|---|---|
| 3,294,946 A | 12/1966 | Baermann | |
| 3,786,222 A | 1/1974 | Harnden, Jr. et al. | |
| 5,352,864 A * | 10/1994 | Schultheis | H05B 3/746 |
| | | | 219/448.17 |
| 8,968,848 B2 | 3/2015 | Quella et al. | |
| 9,795,252 B1 * | 10/2017 | Mandeltort | A47J 37/0786 |
| 10,856,686 B2 * | 12/2020 | Kopiness | H05B 1/0261 |
| 2009/0139986 A1 * | 6/2009 | Lee | H05B 1/0266 |
| | | | 219/625 |
| 2012/0018426 A1 * | 1/2012 | Brosnan | H05B 6/04 |
| | | | 219/672 |

(Continued)

FOREIGN PATENT DOCUMENTS

| | | |
|---|---|---|
| CN | 1381388 A | 11/2002 |
| CN | 204598348 U | 8/2015 |

(Continued)

OTHER PUBLICATIONS

CN107303127A—translation (Year: 2025).*
International Search Report and Written Opinion for PCT/US2023/010563 dated Jun. 5, 2023.

*Primary Examiner* — Elizabeth M Kerr
*Assistant Examiner* — Keith Brian Assante
(74) *Attorney, Agent, or Firm* — Foley & Lardner LLP (57) ABSTRACT

An induction warmer station includes a housing, a cooktop coupled to the housing, an induction coil positioned in the housing adjacent the cooktop, and a controller configured to adjust the frequency of a current input to the induction coil based on an indication of a response of an output current from the induction coil to a change in surface area of load material placed on the cooktop.

21 Claims, 4 Drawing Sheets

(56) References Cited

U.S. PATENT DOCUMENTS

| | | | |
|---|---|---|---|
| 2012/0043312 A1* | 2/2012 | Lee | H05B 6/062 |
| | | | 219/622 |
| 2012/0255946 A1* | 10/2012 | Kim | H05B 6/065 |
| | | | 219/622 |
| 2012/0305544 A1* | 12/2012 | Oagley | H05B 6/1263 |
| | | | 219/622 |
| 2012/0305546 A1 | 12/2012 | Filippa et al. | |
| 2014/0014647 A1* | 1/2014 | Brosnan | H05B 6/062 |
| | | | 219/600 |
| 2015/0201467 A1* | 7/2015 | Yun | H05B 6/04 |
| | | | 219/626 |
| 2015/0341990 A1* | 11/2015 | Nagata | H05B 6/062 |
| | | | 219/622 |
| 2019/0014621 A1* | 1/2019 | Jeanneteau | H05B 6/065 |
| 2020/0351991 A1 | 11/2020 | Nam | |
| 2020/0374989 A1 | 11/2020 | Holtz | |
| 2021/0029787 A1 | 1/2021 | Nam | |
| 2021/0041384 A1 | 2/2021 | Steele et al. | |
| 2023/0027830 A1* | 1/2023 | Corwin | H05B 6/1218 |

FOREIGN PATENT DOCUMENTS

| | | | |
|---|---|---|---|
| CN | 107303127 A * | 10/2017 | A47J 27/002 |
| EP | 3 383 131 | 10/2018 | |
| JP | 2002-051906 B2 | 2/2002 | |
| JP | 2007-317507 | 12/2007 | |
| WO | WO-2009/041429 A1 | 4/2009 | |

\* cited by examiner

INDUCTION WARMER STATION

BACKGROUND

The present disclosure relates generally to food warmer stations for maintaining packaged food items at a desired temperature between preparation of the food items and consumption of the food item. For example, hot foods may be prepared, packaged in a wrapper (e.g., metal foil wrapper) and placed at a food warmer station until a consumer is ready to obtain the food item. Conventional food warmer stations use resistive heaters, heat lamps, etc. to maintain a surface of the food warmer station and/or air proximate the food warmer station at a suitable temperature, for example at a desired temperature for the food item. Such food warmer stations may be energy inefficient in that only a small portion of the heat generated by such stations is transferred into the food items, and because such food warmer stations generally operate at a constant power level regardless of the amount of food held by the warmer. Accordingly, a food warmer station adapted to provide targeted warmth to individual food items at power levels proportional to the size of the food items is desirable.

SUMMARY

One implementation of the present disclosure is an induction warmer station. The induction warmer station includes a housing, a cooktop coupled to the housing, an induction coil positioned in the housing adjacent the cooktop, and a controller configured to adjust the frequency of a current input to the induction coil based on an indication of a response of an output current from the induction coil to a change in surface area of load material placed on the cooktop.

Another implementation of the present disclosure is a method of operating an induction warmer station. The method includes generating a current through an induction coil, obtaining an indication of an amount of load material placed on a cool cooktop proximate the induction coil, heating the load material at a ratio of power to the amount of load material by controlling operation of the induction coil based on the indication, and maintaining the target ratio by automatically adjusting a characteristic of the current to the induction coil in response the indication.

Another implementation of the present disclosure is an induction warmer station configured to warm foil-wrapped food items. The induction warmer station includes a housing, a cooktop coupled to the housing, and an induction coil positioned in the housing adjacent the cooktop. The induction coil includes a plurality of loops electrically connected in series. The plurality of loops are physically arranged in a first order and electrically connected in a second order. The first order is different than the second order.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, induction warmer stations and processes relating to the efficient and effective operation thereof are shown, according to exemplary embodiments. As described in detail below, an induction warmer station can include an induction coil that is operated to induce a current directly in an electrically conducting packaging (conductive packaging) (e.g., metal foil wrappers) for food items placed on the induction warmer station. Due to resistance to current flow in the metal foil wrappers, heat is generated directly in the metal foil wrappers by the eddy currents and thus targeted electromagnetic induction directly to each food item. The induction warmer station can be controlled to provide an amount of power into the foil wrappers (and, relatedly, an amount of heat into the food items) that automatically adjusts to be proportional to a size (e.g., surface area) of the foil material placed on the induction warmer station. A suitable amount of heat can thereby be generated for each food item and provided in a targeted, efficient manner. Other load materials (e.g., steel pans) may have a similar response to operation of the indication warmer station as foil wrappers, enabling different types of load materials to be simultaneously heated by the induction warmer station. These and other advantages will become apparent from the following description of the Figures.

Figure 1:
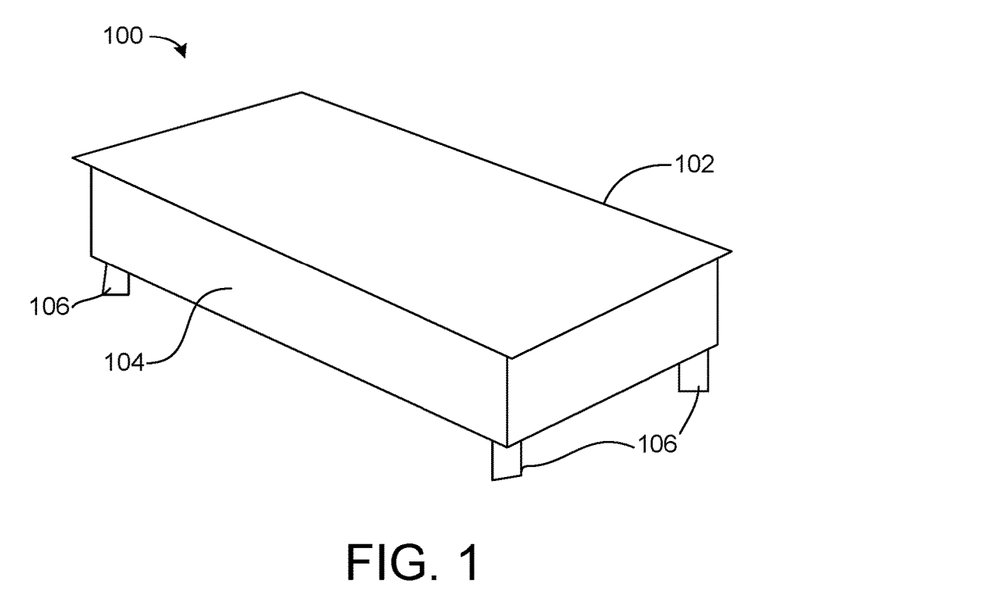
FIG. 1 is a perspective view of an induction warmer station, according to some embodiments.
Figure 2:
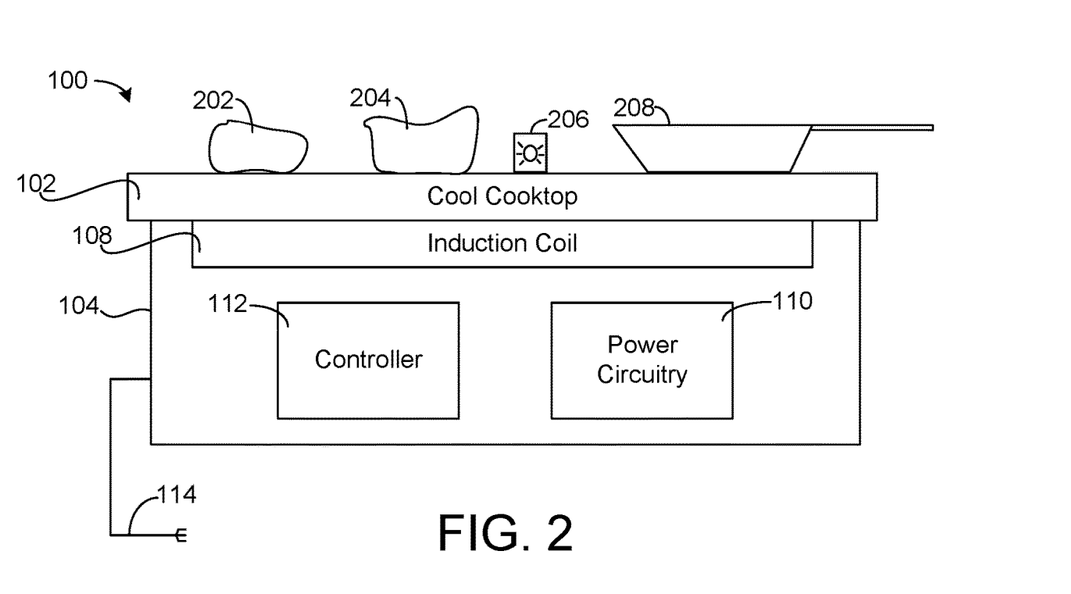
FIG. 2 is a block diagram of an induction warmer station, according to some embodiments.

Referring now to FIGS. 1-2, an induction warmer station 100 is shown, according to some embodiments. FIG. 1 shows a perspective view of the induction warmer station 100, while FIG. 2 shows a schematic diagram of the induction warmer station 100. As shown, the induction warmer station 100 includes a cooktop, shown as cool cooktop 102, positioned on and coupled to a housing 104. The housing 104 is supported by legs 106 (e.g., four legs 106). The housing 104 houses an induction coil 108, power circuitry 110, and a controller 112. The induction warmer station 100 also includes a power cord 114 configured to be connected to an external power source, for example via a standard electrical outlet.

The cool cooktop 102 is shown as a planar surface configured to support a variety of food items or other objects that can be placed thereon. For example, FIG. 2 shows a first packaged food item 202, a second packaged food item 204, a lighting device 206, and a pan 208 positioned on and supported by the cool cook top 102. The cool cooktop 102 and the induction coil 108 are arranged such that the cool cooktop 102 separates the items thereon (e.g., the first packaged food item 202, the second packaged food item 204, the lighting device 206, and the pan 208) from the induction coil 108 while supporting the items within a magnetic field that can be generated by operation of the induction coil 108.

In the main embodiments herein, the cool cooktop 102 is made of a non-magnetic and non-conductive material (e.g., glass) selected to not be substantially affected by operation of the induction coil 108 and to substantially allow a magnetic field generated by operation of the induction coil 108 to extend across the cool cooktop 102. Operation of the induction coil 108 thus does not induce a current in the cool cooktop 102, such that heat is not generated directly in the cool cooktop 102. The material of the cool cooktop 102 can also be chosen to quickly dissipate heat which may be transferred thereto from the heated items placed thereon. The cool cooktop 102 thus remains cool (e.g., near ambient room temperature) during operation of the induction warmer station. In other embodiments, the cooktop 102 is made of a magnetic/conductive material or includes a magnetic/conductive coating on at least a portion of the cooktop, such that operation of the induction coil 108 causes heat generation in such material of the cooktop, thereby enabling contact heating. For example, the cooktop 102 may include a coated portion that heats by operation of the induction coil 108 and an uncoated portion which remains cool except when separate load material (foil packaging, pans, etc.) are placed thereon.

Figure 6:
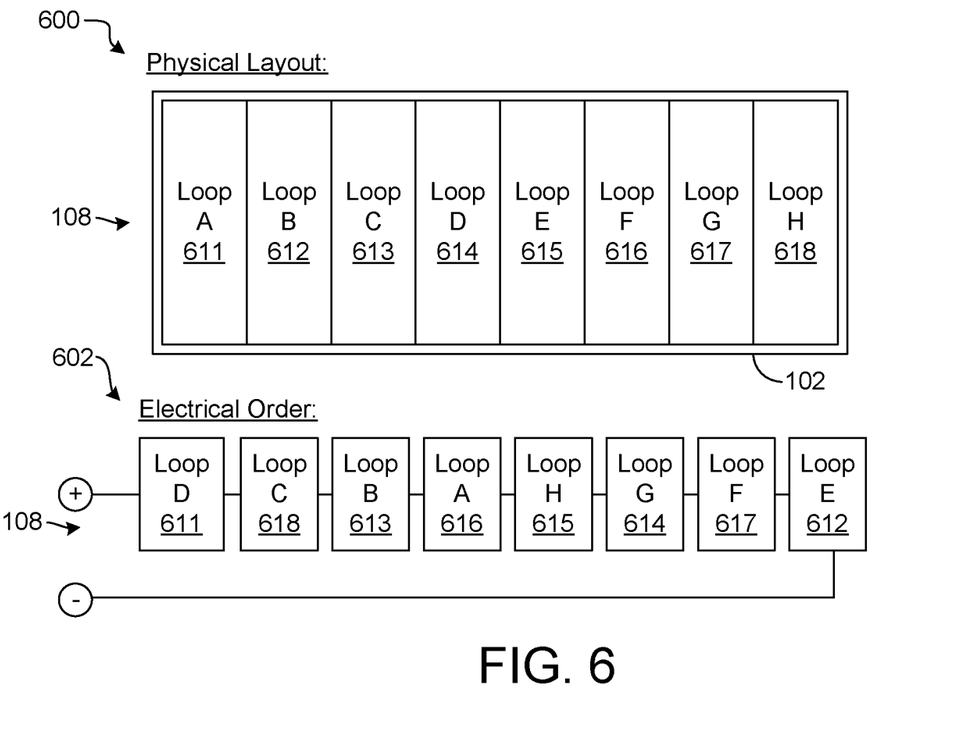
FIG. 6 is a schematic diagram of a layout for loops of an induction coil in an induction warmer station, according to some embodiments.

The induction coil 108 is positioned under and proximate the cool cooktop 102 and positioned in the housing 104. The induction coil 108 includes a conductive wire arranged in one or more loops, for example as illustrated in FIG. 6 and described in detail below. The induction coil 108 can be arranged to be substantially co-extensive with the cool cooktop 102. The induction coil 108 is thereby configured such that a current (alternating current) passing therethrough generates a magnetic field over substantially the entire cool cooktop 102. The induction coil 108 is operable to induce a current in load materials (e.g., metal materials, conductive packaging, inductive material) placed on the cool cooktop 102, for example foil wrappers (e.g., aluminum foil, other metallic foils) used as packaging for food items (e.g., first food item 202 or second food item 204), metal pans (e.g., steel pan 208), or other objects (e.g., lighting device 206 with inductive pickup coil, described in detail below).

The induction coil 108 is conductively coupled to power circuitry 110. The power circuitry 110 is controllable to provide a controllable amount of power to the induction coil 108, for example by changing a frequency of a current to the induction coil 108. The power circuitry 110 can receive electricity from an external power source (e.g., electrical outlet connected to a utility grid via a building electrical system) via power cord 114 and use that electricity to cause a current to flow through the induction coil 108. The power circuitry 110 can include one or more sensors or measurement devices, for example an current sensor (e.g., ammeter) configured to measure the current flowing through the induction coil 108 (e.g., in Amps).

Figure 5:
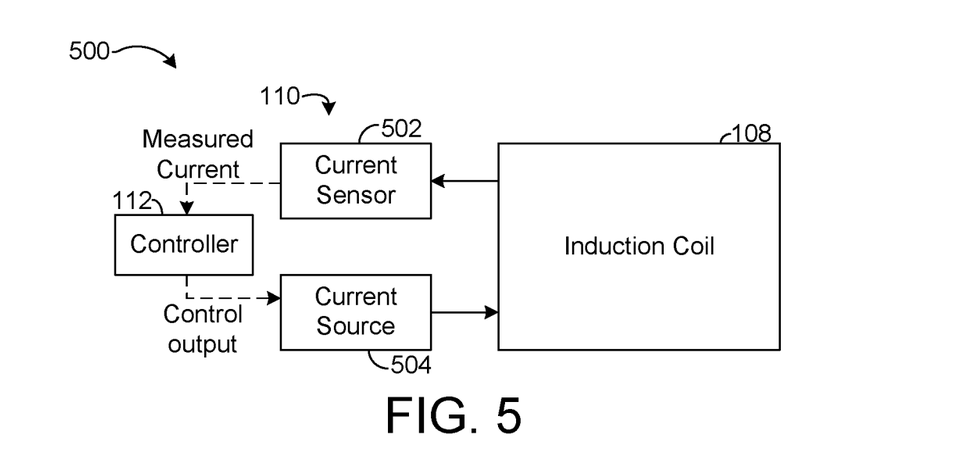
FIG. 5 is a block diagram of a control loop for an induction warmer station, according to some embodiments.

The controller 112 is configured to control operation of the power circuitry 110 to affect the amount of power provided to the items on the cool cooktop 102 (and thus the amount of heat generated at the items on the cool cooktop 102). In some examples, the controller 112 can control the power circuitry 110 to automatically adapt to the amount of load material placed on cool cooktop 102 and in response to a response of a current through the induction coil 108 to changes to the amount of load material placed on cool cooktop 102. For example, the controller 112 can control the power circuitry 110 to provide a constant power-per-unit-surface-area of load material on the cool cooktop 102 (e.g., a constant value of Watts per square inch), for example by controlling frequency to drive measured current to a constant setpoint. The controller 112 can receive an input from one or more sensors of the power circuitry 110 (e.g., from an ammeter) and can use the input in a control loop to control a voltage across and/or power input to the induction coil in a control loop (e.g., a feedback control loop), for example as illustrated in FIG. 5 and described in detail with reference thereto.

The lighting device 206 is configured to emit light when exposed to the inductive effects of operation of the induction coil 108. The lighting device 206 can include an inductive pickup coil configured to have a current induced therein by operation of the induction coil 108, and one or more light-emitting diodes connected to the inductive pickup coil so that the induced current powers the light-emitting diodes and cause the lighting device 206 to emit light. The lighting device 206 can include a housing that can be freely moved around on the cool cooktop 102, removed from the cool cooktop 102, etc. The lighting device 206 can serve as an indicator light or status light that illuminates to indicate that the induction warmer station 100 is on and properly operating, and stops illuminating, or changes its illumination, when the induction warmer station is off or is not properly operating. Because the lighting device 206 is powered via induction by the induction coil 108, the lighting device 206 may be a more reliable indicator of whether the induction coil 108 is operating properly to provide induction heating as compared to an indicator light, switch, etc. with a wired connection to the power circuitry 110 or controller 112 (as may be included in alternative embodiments).

The induction warmer station 100 is thus operable to induce currents directly in metallic foil used in packaging or other conductive packaging for food items placed on the cool cooktop 102, for example in packaging for food items 202 and 204 shown in FIG. 2, as well as in other load materials. The induction warmer station 100 can be used with foil wrappers of various materials, thicknesses, etc. in various scenarios. In some scenarios, use of a consistent foil wrapper (e.g., same metal, same thickness, etc.) for the various food items placed on the cool cooktop 102 can help provide consistency in characteristics of the heating provided to the various food items. In some embodiments, the foil wrappers included aluminum. In some embodiments, the foil wrappers include both aluminum and paper.

As shown in FIG. 2, the induction warmer station 100 is also adapted to induce current in a pan 208, for example a steel pan, to cause heating of the pan 208. FIG. 2 illustrates that the pan 208 and the food items 202, 204 can be placed on the cool cooktop 102 together and simultaneously inductively heated. This allows for flexible, adaptable use of the induction warmer station 100, for example so that food items can be kept warm by placement in the pan 208 rather than by packaging the food items in or with foil wrappers. By controlling the power provided by the induction coil 108 as described in detail below, the induction warmer station 100 avoids overheating (e.g., burning) different food items even where packaged or placed in wrappers or pans of a wide variety of sizes. In various scenarios, the induction warmer station 100 is operable to heat foil wrappers used alone as packaging, foil wrappers included inside of paper, foam, or plastic clamshell to-go boxes, other conductive packaging (i.e., packaging that includes a conductive material suitable for induction heating) or other material suitable for heating via induction (referred to herein as "load material"). Due to the control approaches described in detail below, the induction warmer station 100 is suitable for use with smaller or thinner conductive packaging and a wider range of load material as compared to conventional induction stoves which are configured to work properly only with conductive pans having particular characteristics. This flexibility is accomplished in part by providing an amount of power which corresponds to the size of the material on the cooktop 100, as described in detail below.

Figure 3:
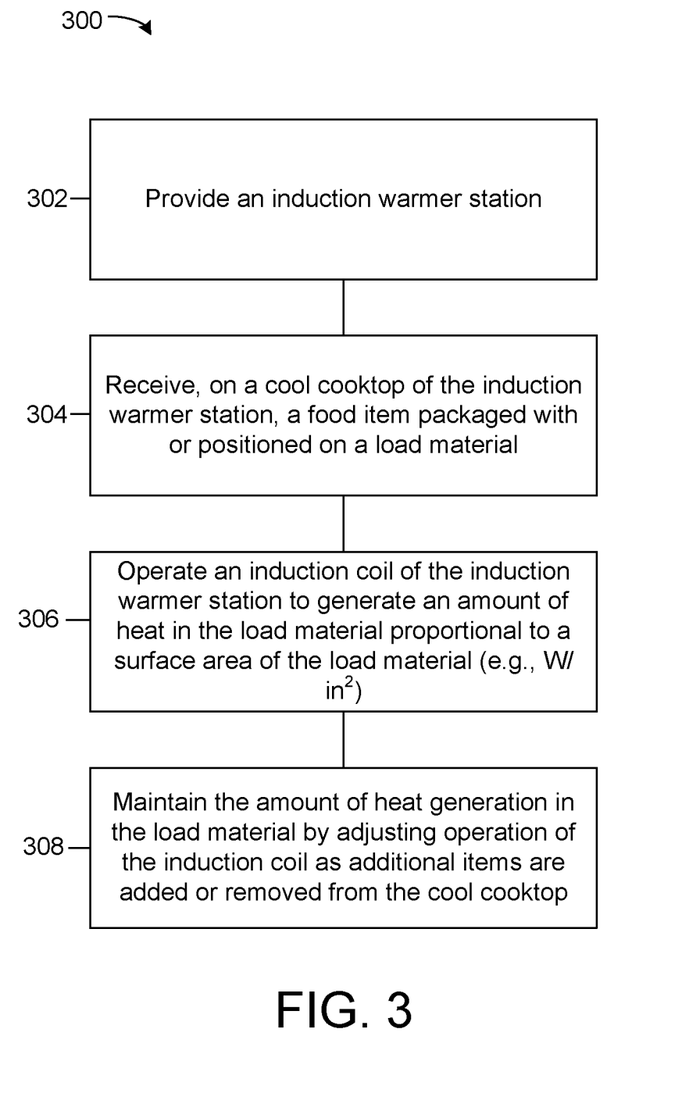
FIG. 3 is a flowchart of a process for warming food with an induction warmer station, according to some embodiments.

Referring now to FIG. 3, a flowchart of a process 300 for warming food with an induction warmer station is shown, according to some embodiments. Process 300 can be implemented using the induction warmer station 100 of FIGS. 1-2, and reference is made thereto in the following description, although other embodiments of an induction warmer station are possible in other implementations. Warming food as in process 300 can include increasing the temperature of food items or substantially maintaining the temperature of food items at temperatures above ambient air temperature.

At step 302, an induction warmer station is provided, for example the induction warmer station 100 of FIGS. 1-2. Providing the induction warmer station can include positioning the induction warmer station on a countertop, table, bar surface, etc. Providing the induction warmer station can also include connecting the induction warmer station to a source of electricity, for example by plugging the power cord 114 of the induction warmer station 100 into a wall outlet.

At step 304, a food item packaged with load material (e.g., a foil wrapper) or otherwise positioned on load material (e.g., on a pan) is received on the cool cooktop 102 of the induction warmer station 100. In some scenarios, the food item is above ambient temperature when received on the cool cooktop 102, for example having been packaged and provided soon after cooking or heating using separate kitchen equipment. In such scenarios, the warm food item is received by the induction warmer station 100 so that the induction warmer station 100 can operate to maintain the relatively high (i.e., higher than ambient) temperature of the food item. The food item can be placed on and supported by the cool cooktop 102 as illustrated for the first food item 202 and second food item 204 in FIG. 2, for example. In other scenarios, the induction warmer station 100 is controlled to heat food items from below ambient temperature (e.g., from frozen) to or above ambient temperature (e.g., to defrost a food item in load material).

At step 306, an induction coil (e.g., induction coil 108) of the induction warmer station is operated to generate an amount of heat in the load material for the food item which is proportional to a dimension of the load material, for example a surface area of the load material. For example, an amount of power can be provided to the food item at a target value of Watts per square inch ($W/in^2$). In some embodiments, the power provided to the exemplary food item is in a range between 0.18 $W/in^2$ and 1.25 $W/in^2$, for example in a range between 0.4 $W/in^2$ and 0.8 $W/in^2$, for example approximately 0.6 $W/in^2$. Other values may be suitable in other embodiments. In some embodiments, the surface area of the load material refers to the amount of the load material in contact with the cool cooktop 102, while in other embodiments the surface area of the load material refers to the entirety of the load material or the surface area within a magnetic field created by operation of the induction coil 108. The target power can be achieved using the approaches described below with reference to FIGS. 4 and 5, for example.

At step 308, the amount of heat generation in the load material (e.g., the target value of Watts per square inch) is maintained as additional items are added or removed from the cool cooktop by adjusting operation of the induction coil. For example, the controller 112 may control the power circuitry 110 to adjust the amount of power provided to the induction coil as a function of the surface area of load material on the cool cooktop 102, for example such that the ration of total power to total surface area matches the target value of Watts per square inch. In some embodiments, step 308 is implemented using the teachings of FIGS. 4 and 5 described below.

Process 300 thus achieves warming of food items placed thereon by generating an amount of heat in the load material for each food item that is proportional to the size of the load material for each particular food item. Food items thus receive different amounts of heat depending upon their size, such that the induction warmer station automatically adjusts the total heat for each food item based on that food item's size. At least because the amount of heat needed to keep a food item warm typically increases with size of the food item (e.g., due to increased heat loss to the ambient environment for larger packages, etc.), process 300 enables the induction warmer station to provide a suitable total amount of heat to each food item. Additionally, by not providing excess heat to any particular food item (or to space not occupied by a food item), process 300 can provide improved energy efficiency relative to other methods of warming food items.

Figure 4:
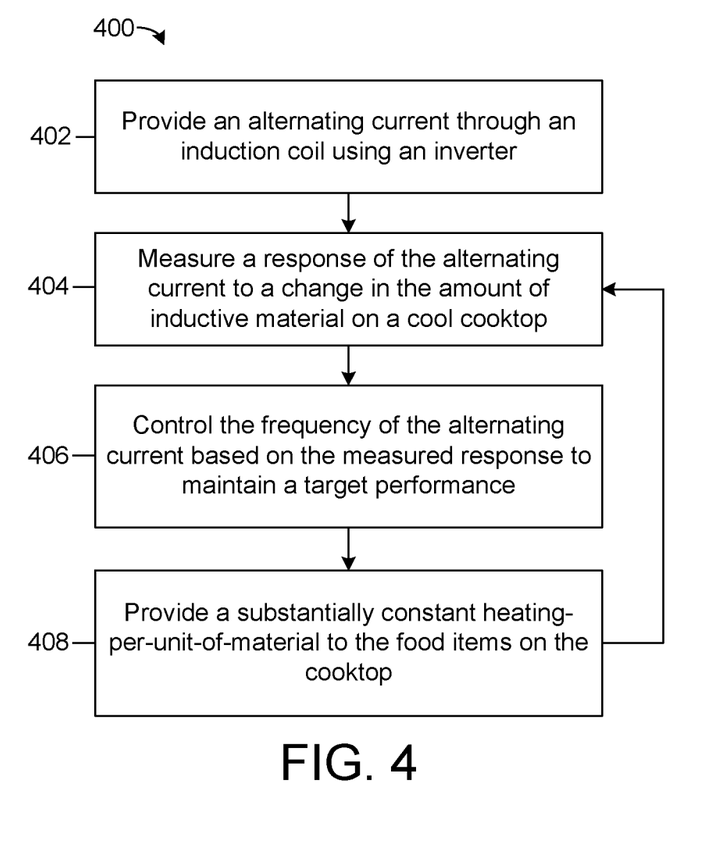
FIG. 4 is a flowchart of a process for operating an induction warmer station, according to some embodiments.

Referring now to FIG. 4, a flowchart of a process 400 for operating an induction warmer station is shown, according to an example embodiment. Process 400 can be executed by the induction warmer station 100 of FIG. 1, for example, and reference is made thereto in the following description. It should be understood that process 400 can be implemented using other hardware in other implementations.

At step 402, an alternating current through the induction coil 108 is generated using power circuitry 110, including an inverter of the power circuitry 110. The alternating current in the induction coil creates a magnetic field that induces a current in conductive packaging (or other load material) placed on the induction warmer station, if any load material is present. The current in the load material generates heat due to resistance to the current in the load material, thereby transferring power from the power circuitry 110 to food items as heat. Due the electromagnetic relationship between the load material and the induction coil 108 (and in accordance with principles of conservation of energy), the amount of heat generated in the load material corresponds to the amount of power provided to the induction coil 108 by the power circuitry 110 at step 402. Changes in the amount of load material affects electrical behavior of the induction coil 108, for example by causing a measurable response in the output current of the induction coil 108 if other parameters (e.g., voltage, power, frequency) are held constant.

At step 404, a response of the alternating current to a change in the amount of load material placed on the cool cooktop 102 of the induction warmer station 100 (e.g., an amount of load material subject to induction heating resulting from the current generated through the induction coil in step 402) is measured. The measurement may be a measurement of one or more performance characteristics of the induction coil 108 or the power circuitry 110, such as a measurement of an output current from the induction coil 108 (or, in alternative embodiments, a voltage across the induction coil 108, an amount of power provided to the induction coil 108, etc.), which may affected by the amount of load material electromagnetically affected by operation of the induction coil 108. FIG. 5 shows such an example and is described below. In other embodiments, an indication of the amount of load material on the cool cooktop 102 may be obtained from a separate sensor or data source. For example, in one alternative embodiment a camera may be arranged to provide images or video of the cool cooktop 102 which can be processed by a machine-learning image recognition algorithm in step 404 to estimate the amount of load material on the cool cooktop 102. As another example, the cool cooktop 102 could include weight sensors (e.g., piezoelectric sensors) configured to weigh any objects placed on the cooktop 102 and use that information to estimate the amount of load material on the cooktop 102. Various indications of the amount of load material on the cooktop are possible in various embodiments.

At step 406, the power circuitry is controlled based on the measurement to maintain a target performance, for example to drive the measurement to a setpoint. For example, frequency of the alternating current can be adjusted in step 406 based on the response measured in step 404, for example to drive a measured output current to a setpoint for the output current using a feedback control approach. Step 406 may result in adjusting the power proportionally to the amount of load material on the cooktop. That is, step 406 can include increasing the power provided from the induction coil when load material is added to the cooktop, thereby ensuring that sufficient power is provided to warm the food items, indirectly by adjusting frequency of the current in the induction coil. Similarly, step 406 can also result in decreasing the power provided by the induction coil when load material is removed from the cooktop, thereby ensuring that remaining items on the cooktop are not over-heated and adaptively reducing energy consumption of the induction warmer station (contributing to energy efficiency of the induction warmer station) (e.g., indirectly by controlling the frequency of the current in the induction coil). In other embodiments, step 406 can include a feedback control process to directly drive a power-to-amount-of-material ratio to a target value (e.g., a target value of Watts or W/in$^2$).

At step 408, a substantially constant heating-per-unit-of-material is provided to the food items on the cooktop. Step 408 results from step 406 and operation of the induction coil to create an induction warming effect in the load material (e.g., foil wrappers) on the cooktop. By adjusting frequency at the induction coil in response to the response measured in step 404, the amount of heat generated is automatically adapted. Overheating and burning of food items or of the load material itself is prevented. Cooling of the food items is also substantially prevented. Appropriate heating of food items is thereby consistently, repeatedly, reliably, and automatically achieved.

As shown in FIG. 4, steps 404-408 can be repeated indefinitely (while the induction warmer station is in an "on" state), including while the amount of load material on the cooktop changes. For example, if a person or people add foil-wrapped food items, steps 404-408 can be executed to maintain constant output current by adjusting frequency, thereby increasing the total power from the coil to load material (and the total heat production at the load material) to provide a substantially constant heating-per-unit-of-material to the food items. As another example, if a person or people remove foil-wrapped food items from the cooktop, steps 404-408 are executed to decrease the total power from the coil to the load material (e.g., by adjusting frequency) to avoid overheating and for energy-efficient operation.

Referring now to FIG. 5, a block diagram of a control loop 500 for the induction warmer station 100 is shown, according to an exemplary embodiment. The control loop 500 includes the induction coil 108, the controller 112, and the power circuitry 110, with the power circuitry shown as including an current sensor 502 and a current source 504. The current source 504 is controllable to provide a current to the induction coil 108, in particular an alternating current with controllable frequency. The current through the induction coil 108 is affected by the effective resistance or impedance of the induction coil 108, which changes based on the amount of load material placed on the induction warmer station 100 (i.e., such that the effective resistance of the induction coil 108 increases when the induction coil 108 operates to heat more material). The effective resistance of the induction coil 108 is thus correlated to the amount of load material on the cooktop 102 and, similarly, the heating load on the induction warmer station 100. The output current from the induction coil 108 can thus be considered as a responding to changes in load material placed on the induction warmer station 100.

The current sensor 502 (e.g., ammeter) is conductively connected to the induction coil 108 and measures the current output from the induction coil 108. The current measured by the current sensor 502 is affected both by characteristics of the current input to the induction coil 108 by the current source 504 and by the effective resistance of the induction coil 108 which varies based on the amount of load material on the cooktop 102. Accordingly, a current measurement by the current sensor 502 can be considered as a measurement of a response of the power circuitry 110 and/or induction coil to changes in the amount of load material on the cooktop 102. As shown in FIG. 5, the current sensor 502 can be configured to provide the measured current to the controller 112.

The controller 112 is configured to generate a control output for the current source 504 based on the measured current from the current sensor 502. The control output for the current source 504 may indicate a target frequency for the alternating current provided by the current source 504 and/or cause the voltage source 504 to increase or decrease the frequency of the current provided to the induction coil 108. The current source 504 can include an inverter which is controllable to change the frequency of the current provided by the current source 504. Other control variables (e.g., power) are possible in other embodiments.

In some embodiments, the controller 112 generates the control output based on a setpoint for the output current (i.e., for the variable measured by the current sensor 502). The controller 112 can be a feedback controller configured to use proportional, proportional-integral, proportional-integral-derivative, etc. control to generate the control output for the current source 504 based on the measured current from the current sensor 502 and the setpoint for the current.

In such embodiments, the control loop 500 operates to maintain a substantially constant current (i.e., at the setpoint for the current) through the induction coil 108 by controlling the current source 504 to vary the frequency of the current input to the induction coil 108 to adapt to a time-varying effective resistance of the induction coil 108 (as indicated by the measurement of the current by the current sensor 502). Due to the first-principles physics, power and resistance are proportional at constant current (i.e., $P=I^2R$, where "P" is power, "I" is current, and "R" is resistance), such that maintaining a substantially constant current causes power consumption to vary linearly with the effective resistance of the induction coil 108, which relates directly to the amount of load material (e.g., surface area of load material) on the cooktop. Because, at constant current, power is proportional to resistance which is proportional to surface area of load material, a constant power-per-unit-surface-area (W/in$^2$) can be achieved by operating the control loop 500 to maintain a constant current. The power through the circuit corresponds to the amount of heat transferred into the food items. The control loop 500 thus takes advantage of the interaction effects between the induction coil 108 and the load material to provide an elegant solution for automatically and adaptively providing a suitable amount of heating directly to each food item.

In some embodiments, the controller 112 controls the current source 504 to provide frequencies in a range far above a resonant frequency. Due to expected characteristics of a frequency versus impedance curve, dynamically controlling frequency through resonant frequency could cause problematic consequences. Accordingly, the power circuitry 110 and induction coil 106 in the embodiments herein are designed such that the current source 504 provides frequencies well above resonant frequency (e.g., one or more orders of magnitude higher) throughout normal operation of the induction warmer station 100 in order to enable reliable and controllable operations. For example, by operating in such a region, the majority of the impedance presented at the inverter output is reactive comparted to reflected load resistance. In other embodiments, an active method of resonance tracking can be used to allow operations closer to resonant frequency.

Referring now to FIG. 6, schematic diagrams of a plurality of loops of the induction coil 108 are shown, according to some embodiments. In particular, FIG. 6 shows a first diagram 600 of the physical layout of the plurality of loops and a second diagram 602 of the electrical order of the plurality of loops.

As shown in FIG. 6, the plurality of loops of the induction coil 108 are arranged in a different physical order than electrical order (i.e., a first order that differs from a second order). In the example of FIG. 6 and shown in the first diagram 600, eight loops are provided in a physical order as loop A 611, loop B 612, loop C 613, loop D 614, loop E 615, loop F 616, loop G 617, and loop H 618, arranged sequentially in that physical order. Providing the induction coil 108 as multiple loops 611-618 allows the induction coil to be substantially coextensive with the cooktop 102, so that the induction coil can provide induction heating over the full cooktop 102.

The loops 611-618 of the induction coil 108 are electrically connected in series, as illustrated in the second diagram 602 of FIG. 6. As shown, the loops 611-618 are electrically connected sequentially as loop D 611, loop C 618, loop B 613, loop A 616, loop H 615, loop G 614, loop F 617, and loop E 612, such that the electrical order (i.e., the order in which the loops 611-618 are connected in series) is different that the physical order.

By staggering (alternating, mixing, intermingling, changing, etc.) the electrical order relative to the physical layout, a total voltage drop across the length of the cooktop 102 is significantly reduced, which reduces shocks or tingling sensations that might otherwise be encountered by users of the induction warmer station 100. The arrangement of coils in FIG. 6 is thus well adapted to provide induction heating over a large surface area (e.g., substantially coextensive with the planar cooktop 102) while minimizing any adverse electrical behavior that may otherwise because by the voltage drop across the induction coil.

As utilized herein with respect to numerical ranges, the terms "approximately," "about," "substantially," and similar terms generally mean+/−10% of the disclosed values. When the terms "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, controllers, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

What is claimed is:

1. An induction warmer station, comprising:
   a housing;
   a cooktop coupled to the housing;
   an induction coil positioned in the housing adjacent the cooktop; and
   a controller configured to maintain a target power-to-surface-area ratio by adjusting the frequency of a current input to the induction coil based on an indication of a response of an output current from the induction coil to a change in surface area of load material placed on the cooktop.

2. The induction warmer station of claim 1, further comprising an ammeter, and wherein the indication comprises a measurement of the output current from the induction coil.

3. The induction warmer station of claim 2, further comprising an inverter, wherein the controller is a feedback controller configured to adjust the frequency to drive the measurement of the current toward a setpoint for the current by controlling the inverter.

4. The induction warmer station of claim 1, wherein the controller is configured to cause power output from the induction coil to change in response to the change.

5. The induction warmer station of claim 1, wherein the cooktop is non-magnetic and non-conductive.

6. The induction warmer station of claim 1, further comprising a lighting device configured to be placed on the cooktop and powered by an induced current in a pickup coil of the lighting device resulting from operation of the induction coil.

7. The induction warmer station of claim 1, wherein the induction coil comprises a plurality of loops electrically connected in series in a first order and physically arranged sequentially in a second order.

8. The induction warmer station of claim 1, wherein the target power-to-surface-area ratio is in a range between 0.18 Watts per square inch and 1.25 Watts per square inch.

9. The induction warmer station of claim 1, wherein the power circuitry comprises an inverter controllable by the controller to affect the frequency.

10. The induction warmer station of claim 1, wherein the induction coil is substantially co-extensive with the cooktop.

11. A method of operating an induction warmer station, comprising:
    generating a current through an induction coil;
    obtaining an indication of a change in an amount of load material placed on a cool cooktop proximate the induction coil;
    heating the load material at a ratio of power to the amount of load material by controlling operation of the induction coil based on the indication; and
    maintaining the ratio by automatically adjusting a characteristic of the current to the induction coil in response the indication.

12. The method of claim 11, wherein obtaining the indication comprises measuring the current as output from the induction coil.

13. The method of claim 12, wherein adjusting the operation of the induction coil based on the indication comprises driving the measurement of the current toward a setpoint for the current by adjusting a frequency of the current.

14. The method of claim 11, wherein adjusting a characteristic of the current to the induction coil comprises controlling a frequency of the current.

15. The method of claim 11, wherein the target ratio is in a range between 0.18 Watts per square inch and 1.25 Watts per square inch.

16. The method of claim 11, wherein the load material comprises aluminum foil.

17. The method of claim 11, further comprising illuminating a lighting device by driving an induced current through the lighting device by the operation of the induction coil.

18. An induction warmer station configured to warm foil-wrapped food items, the induction warmer station comprising:
    a housing;
    a cooktop coupled to the housing; and
    an induction coil positioned in the housing adjacent the cooktop, the induction coil comprising a plurality of loops electrically connected in series, wherein the plurality of loops are physically arranged in a first order and electrically connected in a second order.

19. The induction warmer station of claim 18, wherein the induction coil is coextensive with the cooktop and a portion of the cooktop is coated with a magnetic coating.

20. The induction warmer station of claim 18, further comprising circuitry configured to maintain a constant current through the induction coil.

21. The induction warmer station of claim 18, wherein a first loop of the plurality of loops is physically positioned between a second loop of the plurality of loops and a third loop of the plurality of loops, and wherein the first loop is electrically connected in series to the second loop via the third loop.

* * * * *